(No Model.)

C. B. STILWELL.
TRAIN STOP.

No. 537,495.  Patented Apr. 16, 1895.

WITNESSES:
H. C. Heckendorn
Joseph W. Gunter

INVENTOR
Charles B. Stilwell
BY Charles N. Butler
ATTORNEY (No Model.)   6 Sheets—Sheet 2.
C. B. STILWELL.
TRAIN STOP.
No. 537,495.   Patented Apr. 16, 1895.
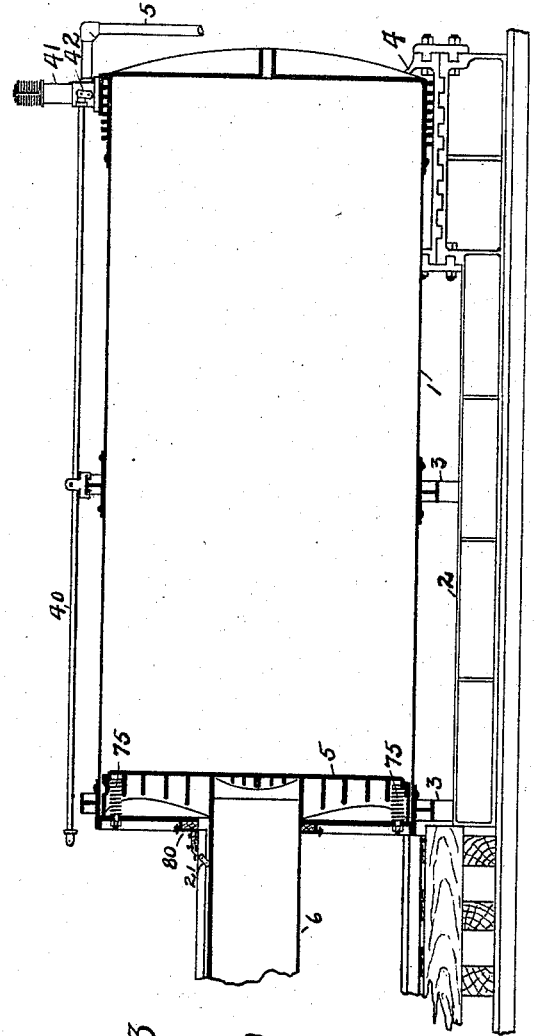
*Fig. 3*
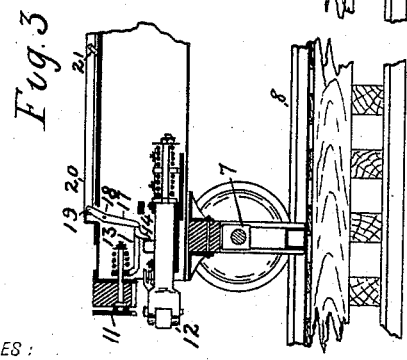
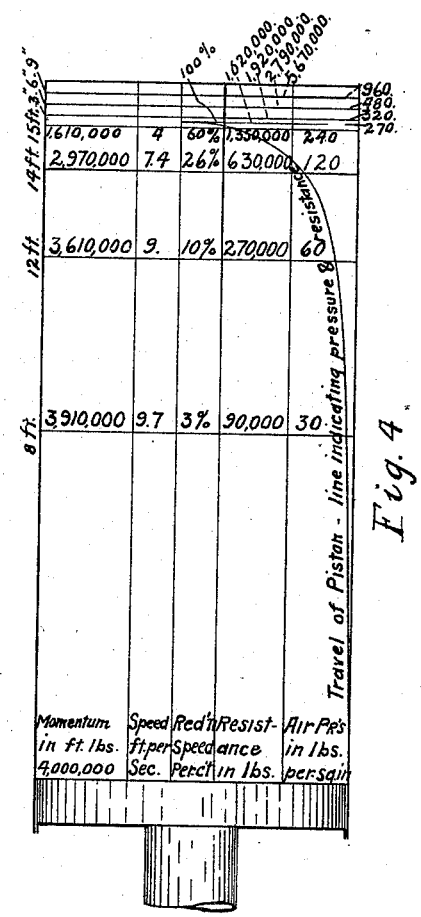
*Fig. 4*
WITNESSES:
H. C. Heckendorn
Joseph W. Currier
INVENTOR
Charles B. Stilwell
BY Charles A. Butler
ATTORNEY (No Model.) C. B. STILWELL. 6 Sheets—Sheet 3.
TRAIN STOP.
No. 537,495. Patented Apr. 16, 1895.
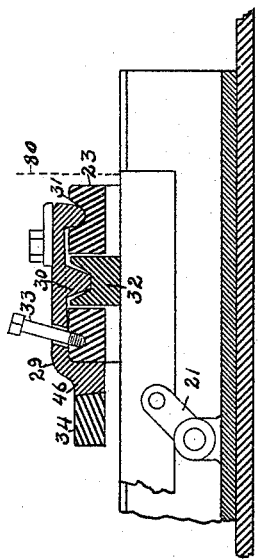
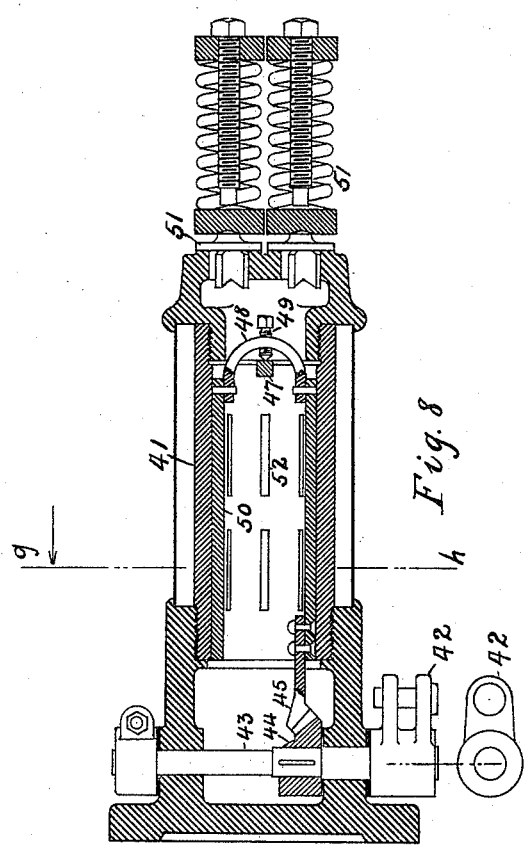
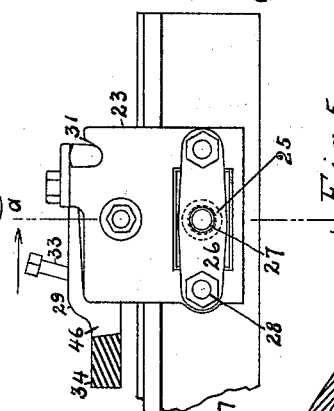
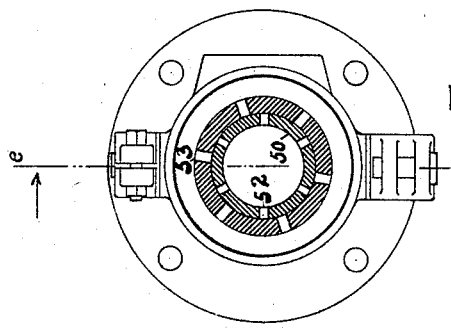
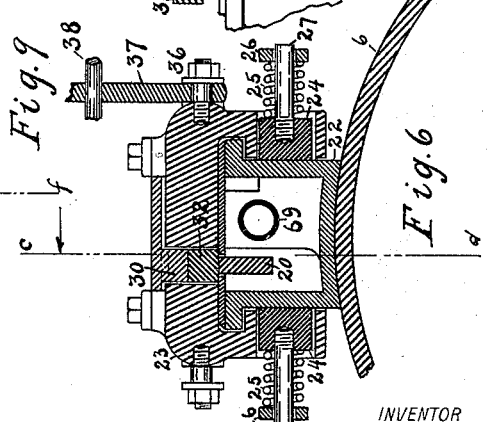
WITNESSES:
H. C. Heckendorn.
Joseph W. Gunter.
INVENTOR
Charles B. Stilwell
BY Charles N. Butler
ATTORNEY (No Model.)  6 Sheets—Sheet 4.
C. B. STILWELL.
TRAIN STOP.
No. 537,495. Patented Apr. 16, 1895.
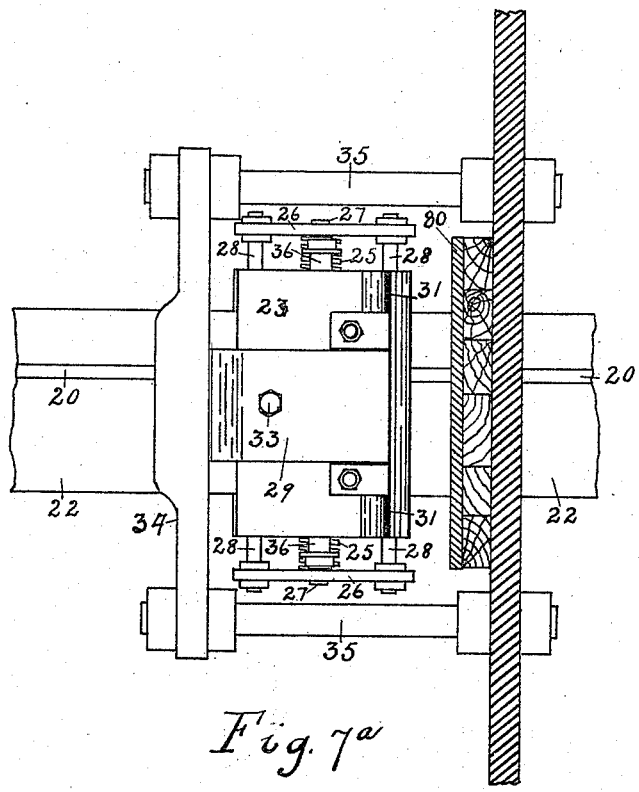
Fig. 7ª
WITNESSES:
INVENTOR
Charles B. Stilwell
BY
Charles N. Butler
ATTORNEY

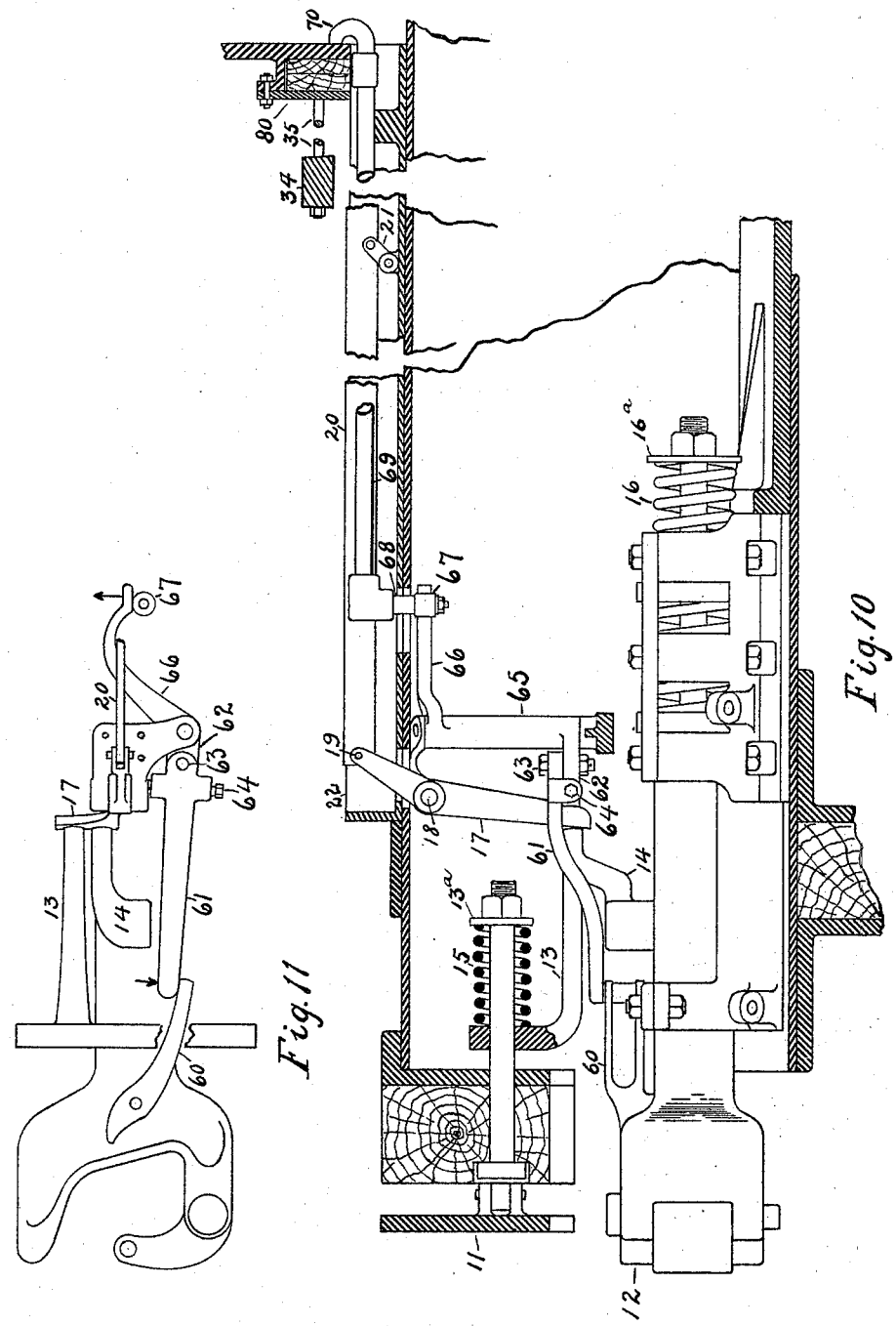

(No Model.)  6 Sheets—Sheet 6.
C. B. STILWELL.
TRAIN STOP.
No. 537,495.  Patented Apr. 16, 1895.
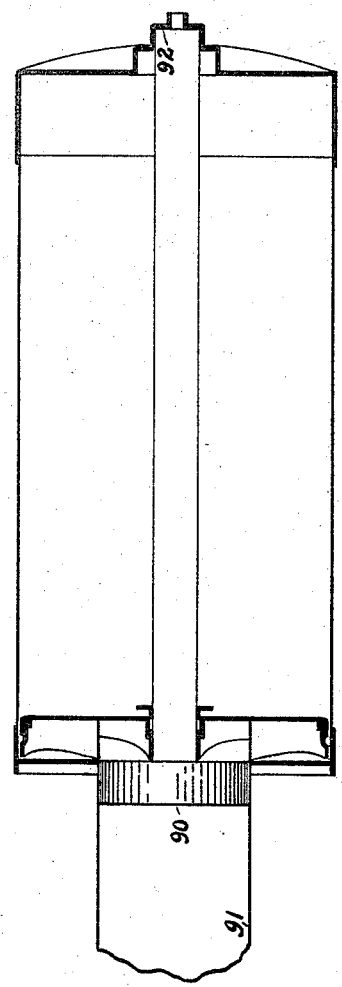
Fig. 12.
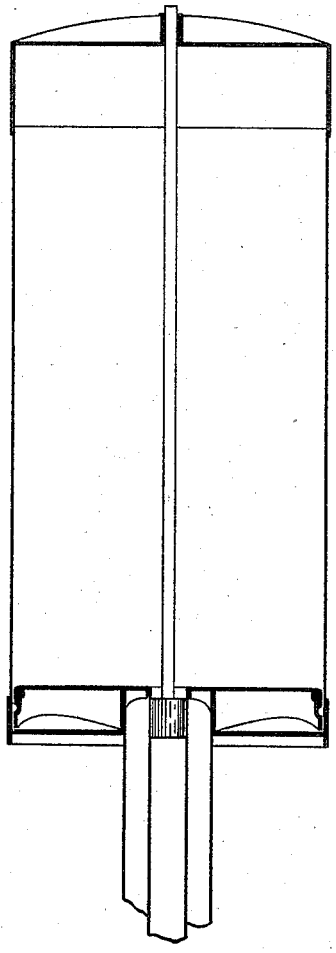
Fig. 13.
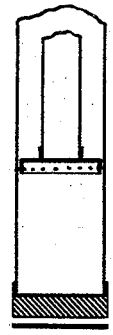
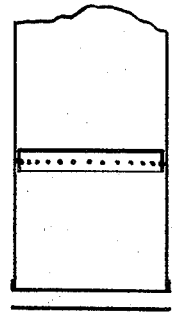
WITNESSES:
H. C. Heckendorn.
Joseph W. Center.
INVENTOR
Charles B. Stilwell
Charles N. Butler
BY
ATTORNEY

UNITED STATES PATENT OFFICE.

CHARLES B. STILWELL, OF WAYNE, PENNSYLVANIA.

TRAIN-STOP.

SPECIFICATION forming part of Letters Patent No. 537,495, dated April 16, 1895.

Application filed July 31, 1894. Serial No. 519,063. (No model.)

*To all whom it may concern:*

Be it known that I, CHARLES B. STILWELL, a citizen of the United States, residing at Wayne, in the county of Delaware and State of Pennsylvania, have invented a new and useful Train-Stop, of which the following is a specification.

My invention is more particularly a pneumatic train stop, to be used in railway terminals; and the objects of my invention are first, to provide effective means for stopping trains and cars or other rolling stock when not under control, and, second, to avoid the violent and injurious shock that results from impact with the buffers now in use whereby rolling stock and buffers are damaged and frequently wrecked and the lives of passengers endangered. I attain these objects by the mechanism illustrated in the accompanying drawings, in which—

Figure 1:
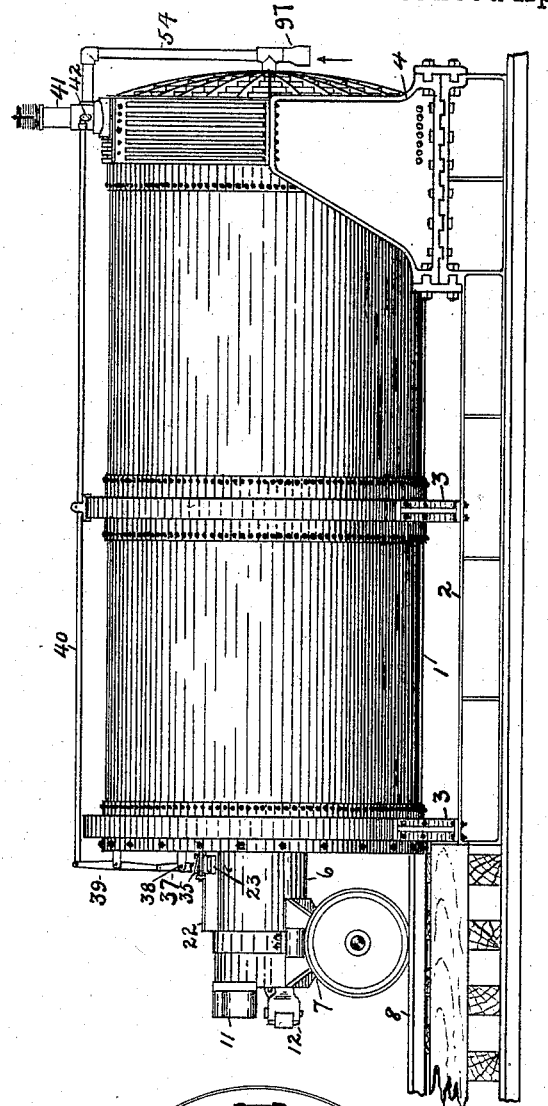
Figure 2:
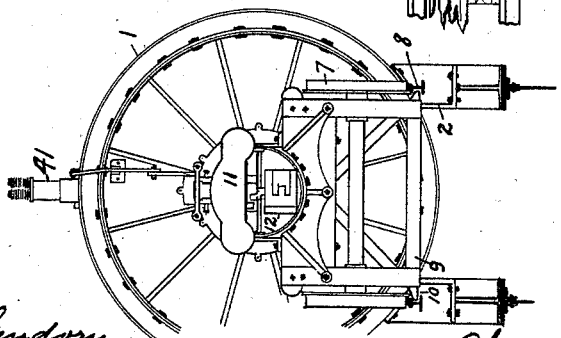

Figure 1 is a side elevation of the complete machine. Fig. 2 is an end elevation. Fig. 3 is a vertical longitudinal section of the machine with the piston drawn out to the initial position. Fig. 4 is a diagrammatic view illustrating the conditions that exist when the machine is in operation, with an analysis of the forces. Fig. 5 is a side elevation of the friction block. Fig. 6 is a section taken on the line $a$—$b$, Fig. 5. Fig. 7 is a section taken on the line $c$—$d$ Fig. 6. Fig. 7$^a$ is a top view of the friction block showing its position with relation to the cylinder head and the crossbar attached thereto. Fig. 8 is a vertical central section of the valve taken on the line $e$—$f$, Fig. 9. Fig. 9 is a horizontal section of the valve taken on the line $g$—$h$, Fig. 8. Fig. 10 is a vertical longitudinal section of the piston rod showing the coupling, coupling releasing and latch operating mechanisms. Fig. 11 is a plan view of the coupling, coupling releasing and latch operating mechanisms. Figs. 12 and 13 are vertical longitudinal sections illustrating specific forms of the piston and cylinder.

Referring to Figs. 1, 2 and 3, of the drawings, the cylinder, 1, is mounted and securely held in place on the frame, 2, of a suitable foundation, by means of the stanchions, 4, and the foundation blocks, 3. A piston having the head, 5, and the hollow rod, 6, moves within this cylinder, the piston rod being supported on a truck or carriage, 7, moving on the track, 8. The frame of the truck is provided with a cross-piece, 9 (Fig. 2), the ends, 10, of which extend under the flanges of the rail heads, to hold the truck down against any tendency to rise. The buffer, 11, and the Janney coupler, 12, at the end of the piston rod are provided with the fixed arms, 13 and 14 (Figs. 3 and 10), each acting independently of the other and bearing against the long arm of the lever, 17, carried on the arbor, 18. The usual compression springs, 15 and 16, acting, respectively, between the arms 13 and 14 and fixed cross pieces 13$^a$ and 16$^a$ are used on the buffer and coupler. The short arm of the lever, 17, is pivoted at 19, to the end of the lift bar, 20, which is connected to the piston rod by means of the links 21. The lift bar lies in a channel, 22, and passes through the friction block, 23, mounted to slide on the channel (Figs. 5, 6 and 7). This block is held to the channel by friction, by means of the gripping blocks, 24, which are pressed against the sides of the channel by the springs 25. Bars, 26, secured to the friction block, as at 28, support the outer ends of these springs, and guide the gripping blocks, the studs, 27, secured to the gripping blocks passing freely through apertures in the bars. The latch, 29, pivoted on the friction block in the bearings, 31, and limited by the stud, 33, is provided with the spud, 30, and toe, 46, the former resting on the loose block, 32, the latter, when down, lying between the friction block and the cross bar 34. This cross bar is secured to the cylinder head by means of bolts, 35, its function being to limit the outward movement of the friction block; and, when the latch is down, to hold the block in position to close the valve 50. The stud, 36, engages a lever, 37, pivoted at 38, the lever being operated by the movement of the friction block and in its turn operating a cylindrical valve, 50, (seated at 41) by means of a second lever, 39, a rod, 40, a crank, 42, and a shaft, 43, which carries a segmental bevel gear, 44, which engages a similar gear, 45, attached to the cylindrical valve 50. This valve is suspended on the cross bar, 47, by means of the yoke, 48, and the pivot, 49, rendering the valve action easy. Ports 52 and 53, are brought into or thrown out of registration by rocking the shaft, 43.

The outlet pipe, 54, leading from the interior of the cylinder to the valve, affords a channel for the escape of air from the cylinder when the ports are brought into registration. The safety valves, 51, capable of regulation to different pressures, perform the usual functions of protecting the mechanism.

The coupler, 12, has the usual knuckle block lever, 60 (Figs. 10 and 11) controlled by a spring concealed in the coupler jaw.

The rock shaft, 65, pivoted as shown, has integral therewith the arm, 62, to which a lever, 61, is pivoted at 63, and regulated by the set screws 64. A second arm, 66, is attached to and, when actuated, rocks the shaft, 65, thus throwing the lever, 61, against the knuckle block lever and moving it in the direction of the arrow. The coupler is thus released.

A rod, 69, lies in the channel, 22, and passes through the cylinder head (Fig. 10) its end being turned as shown at 70, to engage the cylinder head. The other end of this rod is provided with the arm, 68, having the roller, 67, which bears against the curved arm, 66, the roller resting in the deepest part of the curve when the coupler is locked.

The operation is as follows: The mechanism being in the position shown in Fig. 3, a train moving in on the track strikes the end of the piston rod and thrusts in the buffer and coupler and with them the arms, 13, and 14, thus rocking the lever, 17. This action draws back and elevates the lift bar, 20, thus elevating the loose block, 32 (Figs. 6 and 7) which lifts the latch 29, the mechanism being held in this position as long as the buffer or coupler is under pressure. It will be understood that the function of the latch, 29, is to prevent the opening of the valve except by the recoil of the compressed air when the buffer and coupler springs are under compression. The train's impact moves the piston forward and with it the friction block against the cylinder head (unless the block is already in that position, in which case the valve is closed). The movement of the friction block rocks the lever, 37, and through the intermediate mechanism closes the valve, 50, whereby the escape of air from the cylinder is cut off. The closing of the valve is thus rendered certain, although it may be held closed in any position of the piston by moving the friction block toward the cylinder head and dropping the toe, 46, behind the cross bar 34 (Figs. 5 and 7). The momentum of the train is now resisted by the air confined in the cylinder, and, as the piston is forced in, the resistance of the compressed air increases in the ratio of its decreasing volume, according to Mariotte's law.

The diagram, Fig. 4, represents the conditions that exist together with an analysis of the forces when a train weighing two hundred tons, moving at the rate of about seven miles an hour or ten feet per second, and having a momentum of four million foot pounds, strikes the train stop piston acting in a cylinder having an air space sixteen feet long and seven feet three and one-half inches in diameter. At the initial position of the piston the resistance it offers to impact is its own inertia only, the air pressure on each side of the piston being equal. When the piston has been driven eight feet, or to the middle of the cylinder, the volume of air confined in front of it has been reduced by one-half and its pressure consequently doubled, being thirty pounds per square inch, offering an effective resistance of ninety thousand pounds, which reduces the momentum of the train at this point to three million nine hundred and ten thousand foot pounds, the speed to 9.7 feet per second, being a loss of speed of three per cent. When the piston has been driven twelve feet, the original volume of air has been reduced to one-fourth its original bulk and its pressure raised to sixty pounds per square inch, offering an effective resistance of two hundred and seventy thousand pounds which reduces the momentum to three million six hundred and ten thousand foot pounds and the speed to nine feet per second, being a loss of speed of ten per cent. When the piston has moved fourteen feet or seven-eighths of the total distance the air pressure becomes eight times that at the initial position or one hundred and twenty pounds per square inch offering an effective resistance of six hundred and thirty thousand pounds which reduces the momentum to two million nine hundred and seventy thousand foot pounds and the speed to 7.4 feet per second, being a loss of speed of twenty-six per cent. When the piston has moved fifteen feet the air pressure becomes two hundred and forty pounds per square inch offering an effective resistance of one million three hundred and fifty thousand pounds which reduces the momentum to one million six hundred and ten thousand foot pounds and the speed to four feet per second, being a loss of speed of sixty per cent. At a point between fifteen feet and fifteen feet three inches the compressed air reaches a pressure of two hundred and seventy pounds per square inch, offering an effective resistance of one million six hundred and twenty thousand pounds which reduces the train's momentum to zero, the loss of speed being one hundred per cent. At this point the tendency of the confined air is to drive the train back as will readily appear, and as the curve indicating the resistance shows, it being the hyperbola. To check this recoil and prevent the train from being driven back the compressed air is released by opening the valve, 50. This is accomplished by the movement of the friction block, 23, from its position against the cylinder head back into contact with the cross bar, 34, whereby the valve is opened through the intermediate mechanism previously described, the pressure on the buffer and coupler still holding the latch, 29, elevated. The train is thus brought to rest, and, as the piston has been relieved of the pressure of the confined air, it is moved back a short distance into the cylinder by the compressed springs 15 and 16, carrying with it the friction block and closing the valve 50, the toe 46 of the latch dropping in place behind the cross bar, 34, and the rod 20 dropping by gravity, returning the lever 17 to its normal position. If for any reason the friction block should fail to move up to the cylinder head and close the valve at this juncture, this will be effected the instant the piston rod is again struck.

It is thus seen that a train moving at considerable speed may be stopped without great violence, the blow being cushioned and the loss of momentum gradual, while by releasing the compressed air at the beginning of the recoil the undesirable tendency to drive the train back is eliminated. The foregoing analysis of forces shows that economy may be exercised by designing the various sections of the cylinder proportionate to the strains to which they may be subjected.

When the train, which has been automatically coupled to the piston rod, pulls out, it carries with it the piston and the mechanism attached thereto until the turned end, 70, of the rod, 69, strikes the cylinder head (Fig. 10). The piston, cushioned on the springs, 75, continues to move until its action has forced the arm, 66, which bears against the roller, 67, on the now stationary arm, 68, in the direction of the arrow to the position shown in Fig. 11. This action swings the arm, 61, against the knuckle block lever, thus turning the knuckle block and opening the coupler. The tendency to create a vacuum behind the piston as it recedes, is obviated by placing a lift valve of usual type in the inlet, 97. The valve seals the inlet when the pressure of the air in the cylinder is greater than that of the atmosphere, and, when the atmospheric pressure becomes greater, the valve lifts and air flows into the cylinder in the direction of the arrow (Fig. 1). A suitable vent is provided in the opposite head of the cylinder, to insure free communication between the atmosphere and the cylinder space behind the piston head. The mechanism is now in position for further action.

I may use compound cylinders movable relatively as shown in Figs. 12 and 13, by which I am enabled to get an increased resistance area with a comparatively small cylinder.

I have shown in Fig. 12, a secondary piston, 90, and cylinder, 91, the secondary piston being held stationary by the main cylinder head, 92, while the secondary cylinder, which forms the rod of the main piston, moves. Fig. 13 shows a further modified form of compound piston and cylinder. I may return the piston to the initial position independently of the train, and without using the coupler mechanism. This may be accomplished by forcing air into the cylinder under pressure, thus driving the piston out, which can be done without inconvenience or expense in many places. The secondary piston and cylinder may be utilized to advantage in this connection, the form shown in Fig. 13 being adapted for returning the primary piston to its initial position.

It will readily appear that the piston may be stationary while the cylinder carried by the truck is movable.

Having described my invention, I claim as new and desire to secure by Letters Patent—

1. The method of stopping moving trains which consists in overcoming the momentum of the train by the resistance of air confined in a cylinder, acting on a piston projecting in the train's path, and releasing the compressed air by means of and at the beginning of the recoil as shown and described.

2. In a train stop, a cylinder, a piston, a piston truck having a cross bar engaging a track, in combination with the track, as shown and described.

3. In a train stop, in combination, a cylinder, a piston, and a car coupler, substantially as shown and described.

4. In combination, a car buffer having an arm, a rock lever and a lift bar, substantially as shown and described.

5. In combination, a car coupler, a rock lever, a lift bar connected thereto, and a latch, substantially as shown and described.

6. In a train stop, in combination, a cylinder, a piston moving therein, a car coupler having an arm, 14, a car buffer having an arm, 13, a rock lever, a lift bar, and a friction block having a latch, 29, substantially as shown and described.

7. In combination, a rock lever, a lift bar, and a friction block having a latch, 29, and a loose block, 32, substantially as shown and described.

8. A friction block, having bars, 26, and gripping blocks, 24, provided with studs, 27, and springs, 25, substantially as shown and described.

9. A cylinder, in combination with a piston, a valve, a friction block and mechanism connecting the valve and friction block, substantially as shown and described.

10. In combination a cylinder, a piston, and a friction block, substantially as shown and described.

11. In combination with a cylinder having a cross bar, 34, and a valve, a friction block, a piston, and mechanism connecting the valve and friction block, substantially as shown and described.

12. A cylinder having a cross bar, 34, in combination with a piston having a friction block provided with a latch, 29, substantially as shown and described.

13. In combination the friction block, the levers, 37, and 39, the rod, 40, the shaft 43, having the crank, 42, and the gear 44, and the valve, 50, having the gear, 45, substantially as shown and described.

14. A cylindrical valve having a yoke, 48, and a pivot, 49, in combination with the cross bar, 47, attached to the valve seat, substantially as shown and described.

15. A cylindrical valve 50, having a pivot bearing and a gear, in combination with a crank shaft having a gear substantially as shown and described.

16. A valve, 50, having the ports, 52, in combination with the valve seat, 41, having the ports, 53, and the safety valves, 51, substantially as shown and described.

17. In combination, the knuckle block lever of a car coupler, the rock shaft, 65, having the arm, 66, and the arm, 62, the lever, 61, pivoted on the arm, 62, and adjustable therewith, substantially as shown and described.

18. In combination, a car coupler having a releasing lever, a lever which actuates the releasing lever, a rock shaft having a curved arm, and a rod, 69, having the curved end, 70, and the arm 68, substantially as shown and described.

19. In combination, a car coupler having a releasing lever, a lever which actuates the releasing lever, a rock shaft having an arm which operates it, and an arm which engages the rock shaft arm whereby the coupler is released, substantially as shown and described.

20. In combination, a cylinder, a piston working therein, a car coupler and mechanism substantially as described for automatically uncoupling the piston from the car.

21. The cylinder head and piston rod, in combination with the rod, 69, having the turned end, 70, and the arm, 68, the rock shaft having arms 62 and 65, the lever 61, and a knuckle block lever, 60, substantially as shown and described.

22. In combination, a piston rod, a cylinder, a car coupler, and mechanism connecting the cylinder and car coupler, whereby the former releases the latter, substantially as shown and described.

23. In a train stop, in combination, a telescoping compound cylinder and piston, a piston truck, and a railroad track substantially as shown and described.

CHAS. B. STILWELL.

Witnesses:
JNO. F. REARDON,
CHARLES N. BUTLER.